United States Patent
Saini et al.

(10) Patent No.: US 7,816,305 B2
(45) Date of Patent: Oct. 19, 2010

(54) REVERSIBLE SURFACTANTS AND METHODS OF USE IN SUBTERRANEAN FORMATIONS

(75) Inventors: Rajesh K. Saini, Duncan, OK (US); Narongsak Tonmukayakul, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 179 days.

(21) Appl. No.: 12/152,536

(22) Filed: May 15, 2008

(65) Prior Publication Data

US 2009/0286699 A1 Nov. 19, 2009

(51) Int. Cl.
*C09K 8/524* (2006.01)
*C09K 8/60* (2006.01)
*E21B 43/26* (2006.01)

(52) U.S. Cl. .............. 507/239; 507/202; 166/305.1
(58) Field of Classification Search ............ 507/202, 507/239; 166/305.1
See application file for complete search history.

(56) References Cited

U.S. PATENT DOCUMENTS

| | | | | |
|---|---|---|---|---|
| 2,468,180 A | 4/1949 | De Groote et al. | .......... | 252/341 |
| 2,574,537 A | 11/1951 | De Groote et al. | ....... | 260/309.6 |
| 5,744,064 A | 4/1998 | Galante et al. | .............. | 252/358 |
| 5,744,065 A | 4/1998 | Galante et al. | .............. | 252/358 |
| 5,851,434 A | 12/1998 | Galante et al. | .............. | 252/358 |
| 5,919,372 A | 7/1999 | Galante et al. | .............. | 210/708 |
| 6,022,727 A | 2/2000 | Worden et al. | .............. | 435/243 |
| 6,051,035 A | 4/2000 | Galante et al. | ................. | 8/141 |
| 6,306,249 B1 | 10/2001 | Galante et al. | ................. | 162/4 |
| 7,328,744 B2 | 1/2004 | Taylor et al. | ................ | 166/279 |
| 2002/0035154 A1 | 3/2002 | Castillo et al. | .............. | 514/563 |
| 2003/0134751 A1* | 7/2003 | Lee et al. | .................... | 507/200 |
| 2004/0242769 A1 | 12/2004 | Madic et al. | ................ | 525/54.1 |
| 2005/0087341 A1* | 4/2005 | McCabe et al. | ............. | 166/278 |
| 2005/0119405 A1 | 6/2005 | Gomez et al. | .............. | 524/801 |
| 2007/0125542 A1 | 6/2007 | Wei et al. | ................. | 166/308.2 |
| 2007/0167332 A1 | 7/2007 | Subramanian et al. | ...... | 507/240 |
| 2008/0197084 A1* | 8/2008 | Jessop | ........................ | 210/750 |

OTHER PUBLICATIONS

Liu, et al., *Switchable Surfactants*, Science, vol. 313, pp. 958-960, 2006.

* cited by examiner

*Primary Examiner*—Timothy J. Kugel
*Assistant Examiner*—Aiqun Li
(74) *Attorney, Agent, or Firm*—Robert A. Kent; McDermott Will & Emery LLP

(57) ABSTRACT

Certain reversible surfactants, treatment fluids, and methods of use employing such reversible surfactants in subterranean applications are provided. In one embodiment, the methods comprise: providing a treatment fluid comprising a base fluid and a reversible surfactant that comprises a hydrophobic portion and a nitrogen-containing functional group that is capable of reacting with carbon dioxide to form a salt; and introducing the treatment fluid into at least a portion of a subterranean formation.

13 Claims, 2 Drawing Sheets

REVERSIBLE SURFACTANTS AND METHODS OF USE IN SUBTERRANEAN FORMATIONS

BACKGROUND

The present invention relates to subterranean treatment fluids and additives that may be useful in subterranean treatments and oil recovery operations, and more specifically, to certain reversible surfactants, treatment fluids, and methods of use employing such reversible surfactants.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. Examples of common subterranean treatments include, but are not limited to, drilling operations, pre-pad treatments, fracturing operations, perforation operations, preflush treatments, afterflush treatments, sand control treatments (e.g., gravel packing), acidizing treatments (e.g., matrix acidizing or fracture acidizing), "frac-pack" treatments, cementing treatments, and well bore clean-out treatments. In these subterranean treatments, surfactants may be included in a treatment fluid for a number of purposes such as an emulsifying agent, a non-emulsifying agent, a foaming agent, a defoaming agent, a viscosifying (or gelling) agent, a dispersant, a wetting agent, and the like.

While a variety of surfactants have been used in subterranean operations, various problems have been associated with their use. For instance, certain surfactants used heretofore may have undesirable environmental characteristics and/or may be limited by strict environmental regulations in certain areas of the world. As a result, use of these surfactants in subterranean operations may result in the potential for the bioaccumulation and/or persistence of such surfactants in the environment, which may create potential dangers for their use, such as adverse effects on shrimp and other aquatic species. Additionally, in the course of using a surfactant, it may be desirable for the fluid to exhibit the properties that the surfactant imparts only after an initial period of time (e.g., delayed foaming or emulsifying of a fluid), or to "turn off" the surfactant after some period of time (e.g., defoaming or de-emulsifying of a fluid).

In order to control the surface activity or rheological properties imparted to a fluid, certain surfactants containing degradable groups, such as ester-based surfactants, amide-based surfactants, and acetal-based surfactants have been employed in the art. For example, certain of these surfactants may degrade or become otherwise altered (e.g., "cleaved" into pieces) after a certain period of time or under appropriate conditions (e.g., temperature, pH, oxidizers, aqueous environment, etc.), resulting in cessation of the surface active or rheological properties that those surfactants impart to a fluid. However, these degradation and cleaving processes for certain surfactants (e.g., amide surfactants) may require long periods of time or reactants or conditions (e.g., acidic pH, high temperature, etc.) that may be difficult to obtain in a subterranean environment. Moreover, once these surfactants have been degraded or cleaved, generally they are unsuitable for subsequent use.

SUMMARY

The present invention relates to subterranean treatment fluids and additives that may be useful in subterranean treatments and oil recovery operations, and more specifically, to certain reversible surfactants, treatment fluids, and methods of use employing such reversible surfactants.

In one embodiment, the present invention provides methods comprising: providing a treatment fluid comprising a base fluid and a reversible surfactant that comprises a hydrophobic portion and a nitrogen-containing functional group that is capable of reacting with carbon dioxide to form a salt; and introducing the treatment fluid into at least a portion of a subterranean formation.

In another embodiment, the present invention provides methods comprising: providing a fluid comprising a base fluid and a reversible surfactant that comprises a hydrophobic portion and a nitrogen-containing functional group that is capable of reacting with carbon dioxide to form a salt; and allowing the reversible surfactant to increase at least one of the viscosity, shear thinning behavior, or shear thickening behavior of the fluid.

In another embodiment, the present invention provides methods comprising: providing a treatment fluid comprising a base fluid and a reversible surfactant that comprises a hydrophobic portion and a nitrogen-containing functional group that is capable of reacting with carbon dioxide to form a salt, wherein at least a portion of the reversible surfactant is in an inactive state; introducing the treatment fluid into at least a portion of a subterranean formation; and converting at least a portion of the reversible surfactant to an active state.

In another embodiment, the present invention provides methods comprising: providing a treatment fluid comprising a base fluid and a reversible surfactant that comprises a hydrophobic portion and a nitrogen-containing functional group that is capable of reacting with carbon dioxide to form a salt, wherein at least a portion of the reversible surfactant is in an active state; introducing the treatment fluid into at least a portion of a subterranean formation; and converting at least a portion of the reversible surfactant to an inactive state.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
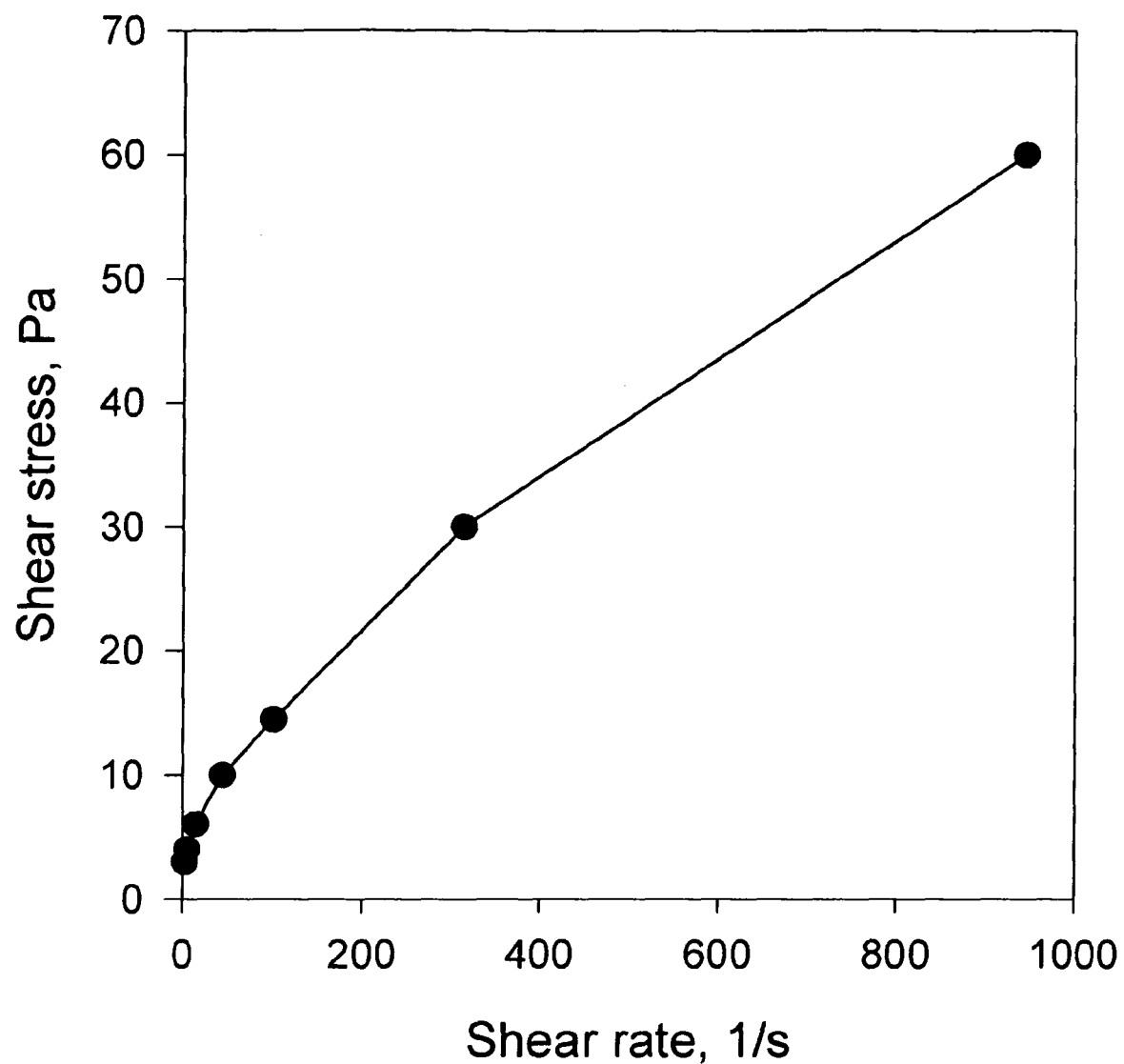
FIG. 1 is a graph showing viscosity data for a sample fluid comprising a reversible surfactant of the present invention.

The present invention relates to subterranean treatment fluids and additives that may be useful in subterranean treatments and oil recovery operations, and more specifically, to certain reversible surfactants, treatment fluids, and methods of use employing such reversible surfactants.

The reversible surfactants of the present invention generally comprise a compound whose molecules include a hydrophobic portion and a nitrogen-containing functional group that is capable of reacting with carbon dioxide to form a salt. Among the many advantages of the present invention, in certain embodiments, these reversible surfactants may, among other things, stabilize emulsions and foams and/or enhance certain rheological properties (e.g., viscosity, viscoelasticity, shear thinning behavior, and/or shear thickening behavior) of fluids in which they are included. For example, emulsions and foams stabilized and fluids viscosified with the reversible surfactants of the present invention may be stable at temperatures of up to about 70° C. for up to about one hour.

Generally, the reversible surfactants of the present invention may be converted between "inactive" states (which is defined as a state in which the reversible surfactant does not substantially show surface activity, emulsify, foam, defoam, or viscosify the fluid in which it is included) and "active" states (which is defined as a state in which the surfactant may be capable of substantially imparting surface activity, emulsifying, defoaming, foaming, or viscosifying the fluid in which it is included). The "active" or "inactive" state of a particular reversible surfactant of the present invention may depend, in part, on the type of fluid (e.g., aqueous, nonaqueous, etc.) in which it is used. As used herein, the term "reversible surfactant" may be used to refer to the surfactant either in its "active" or "inactive" state, or any combination thereof. In certain applications of the present invention, the ability to convert the surfactant between its "active" and "inactive" states may be particularly useful, for example, where it is desirable for a treatment fluid to exhibit certain properties at certain times in the course of a subterranean operation, but perhaps not for the entire duration of the fluid's use or presence in the subterranean formation. Moreover, in certain embodiments, a reversible surfactant in a treatment fluid of the present invention may be converted to its "active" state after it has been converted to its "inactive" state, and thus the treatment fluid of the present invention may be reused repeatedly in that same operation or a subsequent operation. Finally, conversion of the reversible surfactant in a treatment fluid of the present invention to a particular state may cause the reversible surfactant to separate from the fluid, which may facilitate its removal from the fluid for subsequent use of the reversible surfactant or the remainder of the fluid. For example, the reversible surfactant may be converted from an "active" state to an "inactive" state in an aqueous fluid, such that it separates out of the aqueous fluid as an oily layer on top of the aqueous fluid, which may be removed from the remainder of the fluid.

In certain embodiments, the reversible surfactants of the present invention may be able to increase the viscosity of treatment fluids or emulsify water and oil to provide a viscous fluid. In certain embodiments, the fluids of the present invention that comprise a reversible surfactant may exhibit "shear thinning behavior," which is characterized by a decrease in viscosity as shear rate increases. In certain embodiments, the fluids of the present invention that comprise a reversible surfactant may exhibit "shear thickening behavior," which is characterized by an increase in viscosity as shear rate increases. The viscosity, emulsification, shear thinning behavior, and/or shear thickening behavior of the fluids may be measured or described with any means, apparatus, or standard known in the art.

The reversible surfactants of the present invention generally comprise a compound whose molecules include a hydrophobic portion and a nitrogen-containing functional group that is capable of reacting with carbon dioxide to form a salt. Examples of such nitrogen-containing compounds may include, but are not limited to, alkylated amidines (e.g., long chain alkyl amidines), alkylated guanidines (e.g., long chain alkyl guanidines), alkylated monoethanolamine (e.g., long chain alkyl monoethanolamine), alkylated diethanolamine (e.g., long chain alkyl diethanolamine), imidazolines substituted with an alkyl group (e.g., a long chain alkyl group), or any derivative thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound. The reversible surfactants described herein may or may not be capable of or suited for increasing the viscosity, shear thinning behavior, and/or shear thickening behavior of a fluid. Thus, in certain embodiments of the present invention, the reversible surfactant used may be selected specifically for its ability to increase the viscosity, shear thinning behavior, and/or shear thickening behavior of a fluid. In certain embodiments, the reversible surfactant(s) may be tailored by controlling its hydrophilic lipophilic balance (HLB) so that in its "active" or "inactive" form, it may behave as a foamer, defoamer, detergent, emulsifier, viscosifying agent, and/or wetting agent. With the benefit of this disclosure, a person of ordinary skill in the art will be able to determine which reversible surfactants are capable of or suited for increasing the viscosity, shear thinning behavior, and/or shear thickening behavior of a fluid in a particular application of the present invention.

For example, long chain alkyl amidines that may be suitable as reversible surfactants of the present invention may have the following structure:

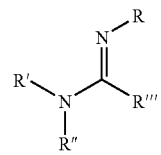

wherein R, R', R", or R'" is an alkyl chain having about 1 to about 22 carbon atoms. Suitable amidines may be prepared by heating N,N-dimethylacetamide dimethyl acetal (DMDA) with long chain primary alkyl amines. This reaction generally yields the "inactive" version of the long chain alkyl amidine surfactant.

Likewise, substituted imidazolines that may be suitable as reversible surfactants of the present invention may have the following structure (inactive state):

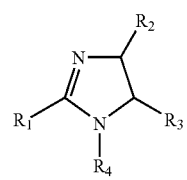

wherein $R_1$, $R_2$, $R_3$, or $R_4$ is an alkyl chain having about 1 to about 22 carbon atoms. These substituted imidazolines may be prepared with various synthesis procedures that will be recognized by one of ordinary skill in the art with the benefit of this disclosure. Additional examples of substituted imidazolines that may be used as the reactive surfactants of the present invention, and synthesis procedures for those compounds, are disclosed in U.S. Pat. Nos. 2,574,537 (issued Nov. 13, 1951) and 2,468,180 (issued Apr. 26, 1949) to De Groote et al., the entire disclosures of which are herein incorporated by reference.

Once prepared in an "i nactive" state, the reversible surfactants of the present invention may be converted to an "active" state, for example, by contacting the reversible surfactant with gaseous or solid carbon dioxide to produce bicarbonate salts that comprise the "active" state of the reversible surfactant. The reversible surfactants may be converted to their "inactive" states, for example, with one or more of the following methods: heating the solution comprising the reversible surfactant; bubbling nitrogen gas, argon gas, methane gas, natural gas, or air through the solution comprising the reversible surfactant; and/or contacting the solution comprising the reversible surfactant with an alkali salt. In certain embodiments, conversion of certain long chain alkyl amidine surfactants of the present invention to their "active" state may proceed according to the equation below:

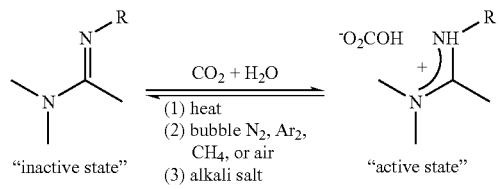

Experiments with certain of these reversible surfactants are described in Liu et al., "Switchable Surfactants," Science, 313: 958-60 (Aug. 18, 2006), which provides additional information regarding testing and use of certain compounds that may be suitable as reversible surfactants of the present invention.

The reversible surfactants of the present invention may be present in or added to a fluid in any amount sufficient to impart the desired properties (e.g., viscosity, viscoelasticity, shear thinning behavior, shear thickening behavior, etc.) to the fluid. In certain embodiments, the reversible surfactant(s) may be present in or added to a fluid in an amount of from about 0.5% to about 5% by weight of the fluid. In certain embodiments, the reversible surfactant(s) may be present in or added to a fluid in an amount of about 2% by weight of the fluid. A person of ordinary skill in the art, with the benefit of this disclosure, will recognize the amount(s) of the reversible surfactant(s) appropriate for a particular application of the present invention.

The fluids of the present invention generally comprise at least one reversible surfactant and a base fluid. The base fluid may comprise any fluid that does not adversely interact with the other components used in accordance with this invention. For example, the base fluid may be an aqueous fluid, a non-aqueous fluid (e.g., mineral oils, synthetic oils, esters, etc.), a hydrocarbon-based fluid (e.g., kerosene, xylene, toluene, diesel, oils, etc.), a foamed fluid (e.g., a liquid that comprises a gas), or an emulsion. In certain embodiments, the reversible surfactant may be combined with a base fluid in one form (e.g., an aqueous liquid, a non-aqueous liquid, or some mixture thereof), and the base fluid subsequently may be changed into a different form (e.g., a foamed fluid and/or an emulsion).

This alteration of the form of the base fluid may be aided by, among other things, the presence and/or state (i.e., "active" or "inactive" state) of the reversible surfactant, or other conditions in the fluid, as will be recognized by a person of ordinary skill in the art.

Suitable aqueous base fluids used in the fluids of the present invention may comprise fresh water, saltwater (e.g., water containing one or more salts dissolved therein), brine, or seawater. Generally, the water may be from any source, provided that it does not contain components that might adversely affect the stability and/or performance of the fluids of the present invention. In certain embodiments, the density of an aqueous base fluid can be adjusted, among other purposes, to provide additional particle transport and suspension in the treatment fluids of the present invention. In certain embodiments, the pH of the aqueous base fluid may be adjusted (e.g., by a buffer or other pH adjusting agent), among other purposes, to reduce the viscosity of the treatment fluid (e.g., activate a breaker or other additive). In the present case, the pH of the aqueous base fluid may be adjusted to convert the reversible surfactant to an "active" or "inactive" state. In these embodiments, the pH may be adjusted to a specific level, which may depend on, among other factors, the types of reversible surfactants, gelling agents, acids, and other additives included in the fluid. One of ordinary skill in the art, with the benefit of this disclosure, will recognize when such density and/or pH adjustments are appropriate. For example, if a reversible surfactant of present invention is in an "active" state at an acidic pH, it may be converted to its "inactive" state by adjusting pH to a basic pH level.

The fluids of the present invention may comprise one or more of any additional additives known in the art, provided that such additives do not interfere with other components of the fluid or other elements present during its use. Examples of such additional additives include, but are not limited to, salts, soaps, co-surfactants, carboxylic acids, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the fluids for a particular application.

In certain embodiments, the methods of the present invention comprise: providing a fluid comprising a base fluid and at least one reversible surfactant; and introducing the fluid into at least a portion of a subterranean formation. Thus, the methods of the present invention may be used prior to, during, or subsequent to a variety of subterranean operations known in the art. Examples of such operations include, but are not limited to drilling operations, pre-pad treatments, fracturing operations, perforation operations, preflush treatments, afterflush treatments, sand control treatments (e.g., gravel packing), acidizing treatments (e.g., matrix acidizing or fracture acidizing), "frac-pack" treatments, cementing treatments, and well bore clean-out treatments. For example, certain embodiments of the present invention may comprise introducing a fluid of the present invention into a portion of a subterranean formation at or above a pressure sufficient to create or enhance one or more fractures in the subterranean formation. "Enhancing" one or more fractures in a subterranean formation may include the extension or enlargement of one or more natural or previously-created fractures in the subterranean formation. In certain embodiments, the methods of the present invention may be used in gravel packing treatments. These methods may comprise: providing a treatment fluid that comprises a base fluid, a reversible surfactant, and a plurality of particulates; introducing the treatment fluid into the subterranean formation; and depositing at least a portion of the particulates in a portion of the subterranean formation so as to form a gravel pack in a portion of the subterranean formation.

In certain embodiments, the reversible surfactants and methods of the present invention may be used to facilitate the recovery of oil, water, or other fluids residing in a subterranean formation (herein referred to as "subterranean fluids") out of the formation, or to facilitate transport of oil, water, or other fluids that were produced previously from a subterranean formation (herein referred to as "produced fluids"), for example, through a pipeline. For example, in certain embodiments, the reversible surfactants of the present invention may be added to a subterranean fluid or a produced fluid, which, either immediately or after further treatments, may convert the subterranean fluid or produced fluid to another form (e.g., an emulsified, foamed, or viscosified fluid) that is transported easily out of the subterranean formation and/or through a pipeline to another location. Following transport, the reversible surfactant may be separated from other components of the fluid, for example, by converting the surfactant to an "inactive" state as described in paragraph [0016] above.

In certain embodiments, the reversible surfactants and methods of the present invention may be used in such a way that imparting or increasing surface activity, rheological properties, viscosity, shear thinning behavior, and/or shear thickening behavior in the fluid (at all or to a certain degree) is delayed for some period of time after the reversible surfactant is added to the fluid. For example, the reversible surfactant initially may exist in the fluid in an "inactive" state. The reversible surfactant then may be converted to an "active" state at some later point in time. For example, carbon dioxide used to initiate this conversion may be added at that later point in time. In certain embodiments, the reversible surfactant in an "inactive" state previously may have been converted from an earlier "active" state. Re-converting that reversible surfactant to an "active" state may, among other things, re-establish the surface activity, rheological properties, viscosity, shear thinning behavior, and/or shear thickening behavior in the fluid without adding further amounts of surfactant or other additives.

In certain embodiments, the methods of the present invention may be used in such a way that the properties imparted by the reversible surfactant to the fluid are removed or reduced after some period of time, for example, after the fluid has been transported to a desired location. For example, the reversible surfactant initially may exist in the fluid in its "active" state. The reversible surfactant then may be converted to its "inactive" state at some later point in time. For example, the heat, bubbled gas, alkali, or buffering action within the subterranean formation used to initiate this conversion may be applied at that later point in time, or the alkali may be encapsulated in a degradable coating that degrades after a period of time such that the alkali may react with the reversible surfactant. In certain embodiments, this may decrease the viscosity, shear thinning behavior, and/or shear thickening behavior of the fluid. In certain embodiments, conversion of the reversible surfactant to a different state may cause the reversible surfactant to separate out of the fluid, thus facilitating its removal from the fluid. These results may be achieved without the need for an additional breaker (although in certain embodiments it still may be desirable to include an additional breaker).

To facilitate a better understanding of the present invention, the following examples of certain aspects of some embodiments are given. In no way should the following examples be read to limit, or define, the entire scope of the invention.

EXAMPLES

Three different reversible surfactants of the present invention were prepared according to the following procedure. In each of 3 flasks, equimolar amounts of N,N-dimethylacetamide dimethyl acetal and a different primary alkyl amine for each flask ($C_{12}H_{25}$—$NH_2$; $C_{16}H_{33}$—$NH_2$; and $C_{22}H_{45}$—$NH_2$) were heated together at 60° C. for 20 minutes without solvent. The methanol by-product was removed at low vacuum in the beginning of the reaction, and a high vacuum was applied at the end to remove the last traces of methanol. Surfactants A-C shown in Table 1 below were the end products of these reactions.

TABLE 1

| Surfactant | Formula |
|---|---|
| A | structure with $C_{12}H_{25}$ |
| B | structure with $C_{16}H_{33}$ |
| C | structure with $C_{22}H_{45}$ |

The purity of the products were determined by proton NMR and found to be greater than 90%. These products were used as the reversible surfactants of the present invention in the examples below without further purification.

Example 1

The capacities of certain reversible surfactants of the present invention to stabilize an emulsion were tested according to the following procedure. Two grams of each of the surfactants listed in Table 1 above were dissolved in 75 mL of NORPAR 12™ fluid (a hydrocarbon-based fluid available from ExxonMobil Corporation of Houston, Tex.) in a different 400-mL beaker for each of Surfactants A-C. To each of these solutions was added 25 mL of water. The two phases in each beaker were stirred to attempt to form emulsions, but no emulsion was formed. Solid carbon dioxide was then added to each beaker, and the beakers were allowed to stand for 15 minutes. The solutions were then stirred in Silverson blender at 5000 rpm for 2 minutes, which yielded oil-in-water emulsions for Surfactants A and B, and a water-in-oil emulsion for Surfactant C. The emulsion formed with Surfactant C was weak, and separated quickly.

The Surfactant A and B emulsions were kept overnight to observe the separation of layers. After 5 hours, the two phases of the emulsions had not separated. After 20 hours, approximately 10 mL water had separated from the emulsions, but the upper layers of the solutions remained emulsified. After 5 days, approximately 15 mL of water had separated from the emulsions, but the upper layers of the solutions remained emulsified. The emulsions were then heated at 60° C. for 30 minutes, which caused the emulsions each to break into two clear layers.

Thus, Example 1 demonstrates that certain reversible surfactants of the present invention may be capable of stabilizing emulsions over long periods of time.

Example 2

Six 100-mL sample fluids were prepared according to the procedure described in Example 1, with the surfactants and oil (NORPAR 12™) and water content listed in Table 2 below for each sample. Rheological properties of emulsions formed with Surfactants A-C were measured using a StressTech rheometer (available from Rheologica Instruments, Lund, Sweden) equipped with a rotating couette system. Two different samples of emulsions were prepared with Surfactant A, each of which was tested at 25° C. and 60° C., respectively. The emulsions prepared with Surfactants B and C were both tested at 25° C.

Figure 2:
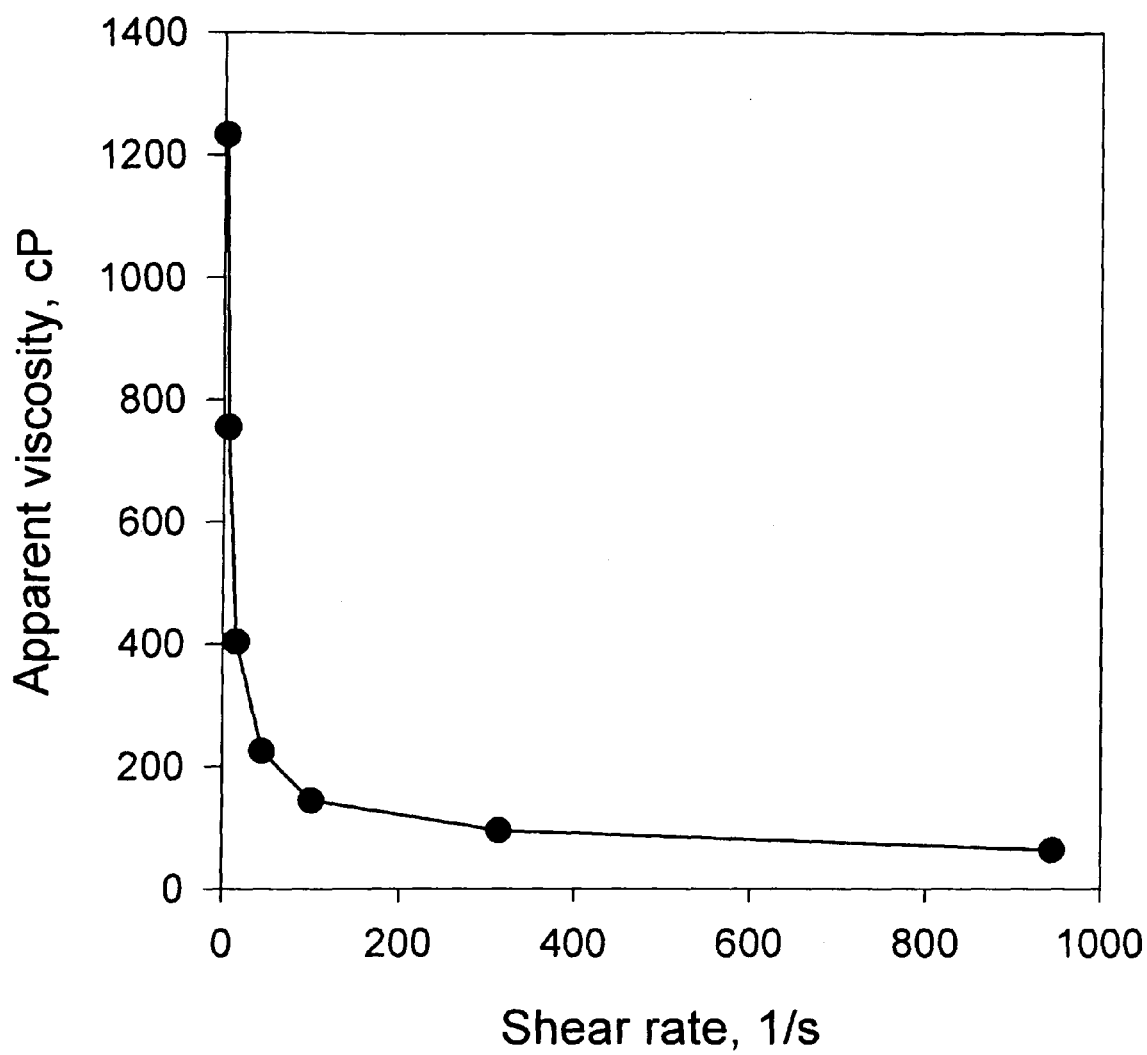
FIG. 2 is another graph showing viscosity data for a sample fluid comprising a reversible surfactant of the present invention.

FIG. 1 shows the typical flow curve of the oil-in-water emulsions formed with Surfactant A in the linear scale. As FIG. 1 shows, these flow curves were nonlinear over the entire range of shear rates tested and the intercept on the shear stress (vertical) axis indicates behavior as a non-Newtonian fluid. FIG. 2 is a typical plot of viscosity versus shear rate for those samples. This figure shows that the apparent viscosity of the emulsions decreased rapidly as shear rate increased, indicating shear thinning behavior.

The rheological behavior for each of the samples also was analyzed in terms of rheological models. The Casson model is one yield stress model suitable to describe flow data of the emulsion samples of the present invention. The formula for the Casson model is shown below:

$$\sqrt{\tau} = \sqrt{\tau_c} + \sqrt{\mu_c \dot{\gamma}} \quad \tau \geq \tau_c$$

$$\dot{\gamma} = 0 \quad \tau < \tau_c$$

wherein $\tau_c$ and $\mu c$ are the Casson yield stress and the Casson viscosity, respectively. $\mu c$ is determined from the square of the slope of a plot of $\sqrt{\tau}$ versus $\sqrt{\dot{\gamma}}$ and is $\tau_c$ determined from the square of the interception on the $\sqrt{\tau}$ axis. The values for $\tau_c$ and $\mu_c$ for each sample analyzed are provided in Table 2.

TABLE 2

| Sample No. | Surfactant (see Table 1) | Oil-Water Ratio (mL) | Temperature (° C.) | $T_c$ (Pa) | $\mu_C$ (cP) |
|---|---|---|---|---|---|
| 1 | A | 66-33 | 25 | 0.46 | 24.9 |
| 2 | A | 66-33 | 60 | 0.22 | 15.4 |
| 3 | A | 75-25 | 25 | 27.0 | 41.3 |
| 4 | A | 75-25 | 60 | 2.1 | 10.1 |
| 5 | B | 75-25 | 25 | 7.6 (8.0) | 78.5 (76.5) |
| 6 | C | 25-75 | 25 | 0.02 | 15.2 |

The reliability of the experimental data was confirmed by using a commercial rheometer equipped with a parallel-plate device to measure the steady state rheological properties of Sample No. 5. The values of $\mu_c$ and $\mu_c$ obtained form the rheometer are shown in Table 2 above in parentheses.

As shown in Table 2, the yield stress and apparent viscosity of the emulsions formed with the reversible surfactants of the present invention decreased with increased temperature, indicating break-down of the emulsion structure.

Thus, Example 2 demonstrates that certain reversible surfactants of the present invention may be capable of increasing viscosity and enhancing rheological properties of certain fluids and emulsions comprising those surfactants.

Example 3

In a 400 mL beaker, 3 grams of Surfactant A was dissolved in 300 mL of water. The surfactant floated on the water surface as an oily layer. Then solid carbon dioxide was added to the water solution, and the beaker was allowed to stand for 15 minutes. The solution was then added to a foam forming blender (Waring blender with multiple impellers) and was stirred at 4000 rpm for 30 seconds. A foam formed that filled the 1200 mL jar. The foam was quickly transferred to a graduated cylinder and allowed to sit at room temperature while the water drainage time was measured. The water drainage time is reported below in Table 3.

TABLE 3

| Time (min) | Water drained (mL) |
|---|---|
| 3 | 30 |
| 5 | 60 |
| 6 | 90 |
| 7 | 110 |
| 8 | 140 |
| 9 | 165 |
| 10 | 185 |
| 11 | 205 |
| 12 | 220 |
| 13 | 230 |
| 14 | 240 |
| 15 | 248 |
| 19 | 260 |

Thus, the half-time of the foam generated in the experiment described above was about 8 minutes.

Thus, Example 3 demonstrates that certain reversible surfactants of the present invention may be capable of stabilizing foams over increased periods of time.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, all numbers and numerical ranges disclosed include the term "about," whether or not stated, and may vary by any amount (e.g., 1 percent, 2 percent, 5 percent, or, sometimes, 10 to 20 percent). Moreover, every range of numerical values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. For example, whenever a numerical range, R, with a lower limit, RL, and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Moreover, the indefinite articles "a" and "an", as used in the claims, are defined herein to mean one or more than one of the element that they introduce. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid comprising a base fluid, a plurality of particulates, and a reversible surfactant that comprises a hydrophobic portion and a nitrogen-containing functional group that is capable of reacting with carbon dioxide to form a salt; and
introducing the treatment fluid into at least a portion of a subterranean formation.

2. The method of claim 1 wherein the reversible surfactant comprises at least one reversible surfactant selected from the group consisting of: an alkylated imidazoline; an alkylated guanidine; an alkylated monoethanolamine; an alkylated diethanolamine; and any derivative thereof.

3. The method of claim 1 wherein the reversible surfactant is present in the treatment fluid in an amount from about 0.5% to about 5% by weight of the treatment fluid.

4. The method of claim 1 wherein the reversible surfactant is present in the treatment fluid in an amount of about 2% by weight of the treatment fluid.

5. The method of claim 1 further comprising depositing at least a portion of the particulates in a portion of the subterranean formation so as to form a gravel pack in a portion of the subterranean formation.

6. A method comprising:
providing a fluid comprising a base fluid and a reversible surfactant that comprises a hydrophobic portion and a nitrogen-containing functional group that is capable of reacting with carbon dioxide to form a salt; and
allowing the reversible surfactant to increase at least one of the viscosity, shear thinning behavior, or shear thickening behavior of the fluid;
introducing the treatment fluid into the portion of a subterranean formation at or above a pressure sufficient to create or enhance one or more fractures in the subterranean formation.

7. A method comprising:
providing a fluid comprising a base fluid, a plurality of particulates, and a reversible surfactant that comprises a hydrophobic portion and a nitrogen-containing functional group that is capable of reacting with carbon dioxide to form a salt; and
allowing the reversible surfactant to increase at least one of the viscosity, shear thinning behavior, or shear thickening behavior of the fluid.

8. The method of claim 1 further comprising increasing at least one of the viscosity, shear thinning behavior, or shear thickening behavior of the treatment fluid by converting at least a portion of the reversible surfactant from an inactive state to an active state.

9. The method of claim 8 wherein converting at least a portion of the reversible surfactant to an active state comprises contacting the reversible surfactant with gaseous or solid carbon dioxide.

10. The method of claim 1 further comprising decreasing at least one of the viscosity, shear thinning behavior, or shear thickening behavior of the treatment fluid by converting at least a portion of the reversible surfactant from an active state to an inactive state.

11. The method of claim 10 wherein converting at least a portion of the reversible surfactant to an inactive state comprises at least one step selected from the group consisting of: heating the treatment fluid; bubbling a gas through the treatment fluid; and contacting the treatment fluid with an alkali salt.

12. A method comprising:
providing a treatment fluid comprising a base fluid and a reversible surfactant that comprises a hydrophobic portion and a nitrogen-containing functional group that is capable of reacting with carbon dioxide to form a salt;
introducing the treatment fluid into at least a portion of a subterranean formation at or above a pressure sufficient to create or enhance one or more fractures in the subterranean formation.

13. A method comprising:
providing a treatment fluid comprising a base fluid, a plurality of particulates, and a reversible surfactant that comprises a hydrophobic portion and a nitrogen-containing functional group that is capable of reacting with carbon dioxide to form a salt;
introducing the treatment fluid into at least a portion of a subterranean formation; and
depositing at least a portion of the particulates in a portion of the subterranean formation.

* * * * *